(12) United States Patent
Feldkamp et al.

(10) Patent No.: US 11,724,641 B2
(45) Date of Patent: Aug. 15, 2023

(54) HAZARD CONDITION WARNING FOR PACKAGE DELIVERY OPERATION

(71) Applicant: Ford Global Technologies, LLC, Dearborn, MI (US)

(72) Inventors: Timothy Mark Feldkamp, Ann Arbor, MI (US); Jianbo Lu, Northvile, MI (US); Adam Wint, Plymouth, MI (US); Kurt Michael Lundeen, Wixom, MI (US); Justin Miller, Berkley, MI (US); Smruti Panigrahi, Farmington Hills, MI (US); Sanghyun Hong, Ann Arbor, MI (US); Pavithra Madhavan, Ontario (CA); Kevin Hwang, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 17/159,043

(22) Filed: Jan. 26, 2021

(65) Prior Publication Data

US 2022/0234604 A1    Jul. 28, 2022

(51) Int. Cl.
*B60Q 1/24* (2006.01)
*B60W 50/14* (2020.01)
(Continued)

(52) U.S. Cl.
CPC .............. *B60Q 1/247* (2022.05); *B60W 40/08* (2013.01); *B60W 50/14* (2013.01);
(Continued)

(58) Field of Classification Search
None
See application file for complete search history.

(56) References Cited

U.S. PATENT DOCUMENTS 7,175,320 B1 *  2/2007  Burgess .................. B60Q 1/24
                                                           362/543
7,378,947 B2 *  5/2008  Daura Luna .......... G08G 1/165
                                                           180/169
(Continued)

FOREIGN PATENT DOCUMENTS

AU       2020202657 A1 * 11/2020   ............. B60Q 9/008
CN         106170828 A  * 11/2016   ............. B60W 30/09
(Continued)

OTHER PUBLICATIONS

D.G. Kidd et al. "The Effectiveness of a Rearview Camera and Parking Sensor System Alone and Combined for Preventing a Collision With an Unexpected Stationary or Moving Object" (Jun. 2015) pp. 689-700.

*Primary Examiner* — Kevin R Steckbauer
(74) *Attorney, Agent, or Firm* — Brandon Hicks; Eversheds Sutherland (US) LLP (57) ABSTRACT

Systems and methods for administering a hazard condition warning during a package delivery operation are provided. The system includes one or more sensors, e.g., radar sensors or cameras, configured to detect a hazard condition in a vicinity of a delivery vehicle and to generate data indicative of the hazard condition. The system further includes an operator sensor configured to detect a location of an operator relative to the delivery vehicle and one or more indicators, e.g., lights, a mobile application installed on a mobile phone, or an HMI of the vehicle, configured to generate an alert corresponding to the hazard condition. A processor of the system may determine whether the hazard condition is present based on the data indicative of the hazard condition, and cause, based on a presence of the hazard condition and the detected location of the operator, the one or more indicators to generate the alert.

15 Claims, 8 Drawing Sheets

(51) Int. Cl.
  *B60W 40/08* (2012.01)
  *G06Q 10/0833* (2023.01)
(52) U.S. Cl.
  CPC ...... *B60Q 2400/40* (2013.01); *B60Q 2400/50* (2013.01); *B60W 2050/143* (2013.01); *B60W 2420/42* (2013.01); *B60W 2420/52* (2013.01); *B60W 2420/54* (2013.01); *G06Q 10/0833* (2013.01)

(56) References Cited

U.S. PATENT DOCUMENTS

| | | | | |
|---|---|---|---|---|
| 7,586,402 | B2 * | 9/2009 | Bihler | B60Q 9/008 |
| | | | | 49/31 |
| 8,650,799 | B2 * | 2/2014 | Chen | B60Q 1/324 |
| | | | | 296/146.1 |
| RE44,787 | E * | 3/2014 | Burgess | B60Q 1/323 |
| | | | | 362/543 |
| 8,922,388 | B2 * | 12/2014 | Nykerk | B60Q 1/0023 |
| | | | | 340/901 |
| 9,146,898 | B2 | 9/2015 | Ihlenburg et al. | |
| 9,718,405 | B1 | 8/2017 | Englander | B60Q 9/008 |
| 9,849,829 | B1 * | 12/2017 | Salter | B60Q 1/0023 |
| 10,000,172 | B2 * | 6/2018 | Gurghian | G01S 17/93 |
| 10,040,392 | B2 * | 8/2018 | Salter | B60Q 1/2665 |
| 10,059,263 | B2 * | 8/2018 | Paszkowicz | B60Q 3/16 |
| 10,284,822 | B2 * | 5/2019 | Murar | H04N 7/183 |
| 10,311,313 | B2 * | 6/2019 | Yamane | G06V 20/58 |
| 10,415,276 | B2 * | 9/2019 | Bussis | E05B 81/77 |
| 10,596,958 | B2 * | 3/2020 | Rowell | B60Q 1/525 |
| 10,822,845 | B2 * | 11/2020 | Bussis | E05B 81/78 |
| 10,968,667 | B2 * | 4/2021 | Nottebaum | E05C 17/12 |
| 11,167,775 | B2 * | 11/2021 | Zhang | B60W 30/095 |
| 11,168,506 | B2 * | 11/2021 | Schulz | B60Q 1/50 |
| 11,432,094 | B2 * | 8/2022 | Yamazaki | G06V 20/58 |
| 11,443,520 | B2 * | 9/2022 | Tsunashima | G08G 1/16 |
| 11,472,432 | B2 * | 10/2022 | Awano | G06V 20/56 |
| 2009/0033477 | A1 * | 2/2009 | Illium | E05C 17/00 |
| | | | | 280/727 |
| 2012/0194356 | A1 * | 8/2012 | Haines | G08G 1/161 |
| | | | | 340/933 |
| 2013/0234844 | A1 * | 9/2013 | Yopp | B60Q 9/008 |
| | | | | 340/435 |
| 2014/0218212 | A1 * | 8/2014 | Nykerk | B60R 1/1207 |
| | | | | 340/901 |
| 2015/0284984 | A1 * | 10/2015 | Kanter | B60R 25/24 |
| | | | | 49/31 |
| 2015/0321671 | A1 * | 11/2015 | Simmons | B60W 30/143 |
| | | | | 701/93 |
| 2016/0208537 | A1 | 7/2016 | Senguttuvan | B60W 50/0098 |
| 2016/0375830 | A1 * | 12/2016 | Karner | H04N 7/181 |
| | | | | 348/148 |
| 2017/0021759 | A1 * | 1/2017 | Zhang | B60R 21/0134 |
| 2017/0043712 | A1 * | 2/2017 | Paszkowicz | B60Q 3/80 |
| 2017/0124404 | A1 * | 5/2017 | Yamane | G06V 40/103 |
| 2017/0237945 | A1 * | 8/2017 | Murar | H04N 7/183 |
| | | | | 348/148 |
| 2017/0369016 | A1 * | 12/2017 | Gurghian | B60W 50/14 |
| 2017/0371347 | A1 * | 12/2017 | Cohen | G06T 7/277 |
| 2018/0044963 | A1 * | 2/2018 | Gomez | B60J 5/0493 |
| 2018/0174450 | A1 * | 6/2018 | Im | B60Q 1/50 |
| 2018/0238098 | A1 * | 8/2018 | Rhode | B60R 21/0134 |
| 2019/0111918 | A1 * | 4/2019 | Kumar | G06V 20/58 |
| 2019/0126815 | A1 * | 5/2019 | Morel | B60Q 1/525 |
| 2019/0232863 | A1 * | 8/2019 | Rowell | B60Q 5/006 |
| 2019/0243371 | A1 | 8/2019 | Nister et al. | |
| 2020/0339145 | A1 * | 10/2020 | Zhang | H04R 5/02 |
| 2021/0201052 | A1 * | 7/2021 | Ranga | B60W 30/0956 |
| 2021/0221396 | A1 * | 7/2021 | Awano | B60R 21/00 |
| 2021/0279477 | A1 * | 9/2021 | Tsunashima | H04N 23/698 |
| 2021/0287546 | A1 * | 9/2021 | Englander | B60Q 5/006 |
| 2022/0041177 | A1 * | 2/2022 | Zhang | B60W 30/095 |
| 2022/0234604 | A1 * | 7/2022 | Feldkamp | B60W 50/14 |

FOREIGN PATENT DOCUMENTS

| | | | | |
|---|---|---|---|---|
| CN | 106627359 | A * | 5/2017 | B60Q 9/00 |
| CN | 106170828 | B * | 4/2020 | B60W 30/09 |
| CN | 111252415 | A * | 6/2020 | B65F 1/14 |
| CN | 112100445 | A * | 12/2020 | G06F 16/732 |
| CN | 113212427 | A * | 8/2021 | B60L 50/66 |
| CN | 113276770 | A * | 8/2021 | |
| CN | 114021896 | A * | 2/2022 | |
| CN | 114889524 | A * | 8/2022 | |
| DE | 102013222137 | A1 * | 4/2015 | B60Q 1/24 |
| DE | 102015224349 | A1 * | 6/2017 | |
| DE | 102017113596 | A1 * | 12/2017 | B60B 39/00 |
| DE | 102016225643 | A1 * | 6/2018 | B60R 1/00 |
| DE | 102019204790 | A1 * | 10/2020 | |
| DE | 112018008107 | B4 * | 5/2022 | B60K 35/00 |
| DE | 102022101599 | A1 * | 7/2022 | B60W 50/14 |
| EP | 3293717 | A1 * | 3/2018 | B60Q 5/006 |
| EP | 3730374 | A1 * | 10/2020 | B60Q 9/00 |
| EP | 3126205 | B1 * | 5/2022 | B60Q 1/2669 |
| ES | 2921452 | T3 * | 8/2022 | B60Q 1/2669 |
| FR | 3060485 | A1 * | 6/2018 | B60R 1/00 |
| GB | 2525655 | A * | 11/2015 | B60K 35/00 |
| JP | 2004348458 | A * | 12/2004 | |
| JP | 2009121053 | A * | 6/2009 | |
| JP | 5064976 | B2 * | 10/2012 | |
| JP | 2018163530 | A * | 10/2018 | |
| KR | 1778624 | B1 * | 9/2017 | B60Q 1/52 |
| KR | 2067547 | B1 * | 1/2020 | B60W 30/08 |
| WO | WO-2015165730 | A1 * | 11/2015 | B60K 35/00 |
| WO | WO-2018051810 | A1 * | 3/2018 | B60R 1/00 |
| WO | WO-2020108658 | A1 * | 6/2020 | B65F 1/14 |
| WO | WO-2021137313 | A1 * | 7/2021 | |
| WO | WO-2022206336 | A1 * | 10/2022 | |

* cited by examiner

HAZARD CONDITION WARNING FOR PACKAGE DELIVERY OPERATION

BACKGROUND

The proliferation of ecommerce has led to an increase in the shipping of goods to homes and businesses. It is therefore desirable to provide coordinated vehicle actions and functions that are tailored for safe and efficient package delivery. While the driver assistance technology may be used to improve efficiency during driving, there are limited technologies specified for the "last 100 meters" when the delivery vehicle is stopped at the destination.

It is with respect to these and other considerations that the disclosure made herein is presented.

DETAILED DESCRIPTION

Overview

In order to improve the efficiency of the work done by operators of delivery service providers (DSPs) and reduce cost, delivery vehicles need to have special functionalities tailored for the goods delivery purpose. In accordance with the principles of the present disclosure, a system is provided that configures the delivery vehicle to assist the delivery driver. This system, intended for delivery fleet vans and trucks, utilizes additional software with minimal or low-cost hardware modifications. The features of this system aim to facilitate the package delivery operations after the delivery vehicle arrived at the delivery destination. Accordingly, the present disclosure focuses on the actual delivery operation during the last phase, e.g., last 100 meters, instead of the whole last-mile goods journey.

One of the steps of the delivery procedure is the DSP operator's exit from the delivery vehicle and their movement around the delivery vehicle. This step is routinely performed dozens of times per day but unfortunately may be at times dangerous. Hazards include passing vehicle traffic of which the DPS operator may be unaware, as well as slippery surfaces or potholes in the pavement obscured by poor lighting conditions. Accordingly, the present disclosure provides a system that may detect and warn the DSP operator of imminent hazards around the delivery vehicle through use of existing or inexpensive sensing hardware and lighting. This system may be integrated into a delivery control system that may coordinate control actions of the intelligent delivery vehicle at the delivery destination, e.g., when the delivery vehicle is parked, to improve the DSP operator's safety, reduce workload, shorten the delivery operation time, thereby minimizing the mean time to start the next delivery, reduce energy waste, and improve the operation smoothness.

The architecture of a typical delivery vehicle includes various control modules for different applications including powertrain control module, chassis control module, vehicle dynamics control module, restrain control module, driver warning system, pre-crash sensing system, together with various interior and exterior sensors. Accordingly, the systems described herein may interact with the existing control modules, e.g., the body control module to manage the door controls, the powertrain control module to manage the engine on and off actions, the chassis control to manage the chassis leveling systems, the driver assistance systems to receive vison data for tracking and detecting purposes, or the vehicles' SYNC or IP system for issuing warning information to the delivery operator.

The system may only be activated when the vehicle arrives at the destination and stops, and will be deactivated as soon as the vehicle is moving. The relative position of the operator with respect to the delivery vehicle is needed in order for the warnings to be relevant. When the vehicle has been placed in park but the driver's door is still closed, the system may assume that the operator is inside the vehicle and the alerts would be placed in close proximity to the operator's seat, e.g., the driver's seat. When the operator leaves the vehicle, a key fob associated with the operator may be used to determine the relative location of the operator. When the operator returns to the vehicle following the delivery, the key fob may be used to confirm that the operator is in fact inside the vehicle. Another method to determine the position of the operator outside the vehicle is the use of onboard external cameras placed around the periphery and software to detect object and track persons within the frames of the video stream, e.g., pre-trained convolutional neural networks.

Before the delivery operator steps out of the vehicle, the vehicle may use its onboard sensors to determine if there are any fast moving objects (e.g., bicycle, e-scooter, car) approaching the proximity where the operator is going to step out. Slower objects such as parked cars, joggers, or pedestrians would be rejected in order to prevent false alarm. Vehicles heading away from the van would also be rejected. The position, speed, distance and direction of travel of the object may be sent to the onboard processor, and a warning customized to the moving object may be issued. Additionally, the system may detect if there is enough space from surrounding static objects for the operator to step out (e.g., using ultrasonic sensors). The system may also detect if there are any slippery surfaces or tripping hazards such as potholes in the walking area surrounding the delivery vehicle. The detection of slippery surfaces or tripping hazards surrounding the vehicle may be performed by onboard external cameras placed around the periphery and aimed downward such that the ground is visible on all sides. In a night time scenario, exterior LED lighting at ground level may be used to illuminate the walking area. The video frames from the external camera would be sent to a real-time object detection system specifically trained to detect poor surfaces conditions such as snow, ice, potholes and other common tripping hazards. The location of a detected hazard in the camera image would then be correlated to its physical location near the operator. When the operator steps out of the van, the cameras and object detection within frames of the video stream may be used to track the position of the operator relative to the hazard and to help the system determine where the operator is in the delivery process. External LED illumination may be used to light the path for the operator and to help track the operator.

If a hazard is detected, the vehicle may provide a warning to the operator. The type of warning may depend on where in the operator is in the delivery sequence or the type of hazard detected. When the operator is still inside the vehicle, interior lights and notifications may be used. An installed mobile phone application linked to the system may receive a text notification from the processor of the system that a hazard is detected. The notification may be accompanied by a preselected sound or vibration, chosen to alert the operator that an imminent hazard exists. When the operator is outside the vehicle, then the location of a hazard may be shown by flashing exterior lights of the vehicle, changing the color of the external LED lighting, by flashing of the LED lighting in the location of the hazard, or by sequencing the flashing of the LED's to indicate the direction of travel of the hazard. If a moving object is detected that would interfere with the opening the door, then an audible voice message may be provided inside the vehicle stating that there is a moving object and the operator should wait before opening the door. A screen in the vehicle may display a bird's eye graphic of the vehicle with the location of all detected hazards highlighted and/or blinking. Additionally, an inside light may flash in the door area or on the side view mirror to indicate that there may be a hazard.

After it is determined that the moving object hazard is gone, the lights may stop flashing and an "all clear" audible voice message may be provided through the vehicle. The text message on the vehicle screen would also disappear. If a static object is detected that would interfere with the opening the door, then an audible voice messages may be sent through the vehicle stating that there is an object blocking the door. The vehicle screen may display a bird's eye graphic of the vehicle with the location of all detected hazards highlighted and/or blinking. An inside light may flash in the door area or on the side view mirror to indicate that there may be a hazard. In addition, an external LED may flash and illuminate the static object. If a slipping or tripping hazard is detected in the region surround the vehicle, then an audible voice message may be sent through the vehicle stating the relative location of the hazard. The vehicle screen may display a bird's eye graphic of the vehicle with the location of all detected hazards highlighted and/or blinking. An external LED may flash and illuminate the location of the hazard. If a moving object is detected that would interfere movement of the operator around the van, then the exterior LED lighting may flash in the region of the vehicle where the moving threat is headed toward. The flashing LEDs may be sequenced to suggest the region of interest and direction of travel of the moving object. Additionally, exterior lights (e.g., headlights, brake lights, tail lights, side markers) of the vehicle may blink on the side where the cross traffic is detected to alter the operator of the danger.

ILLUSTRATIVE EMBODIMENTS

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Figure 1:
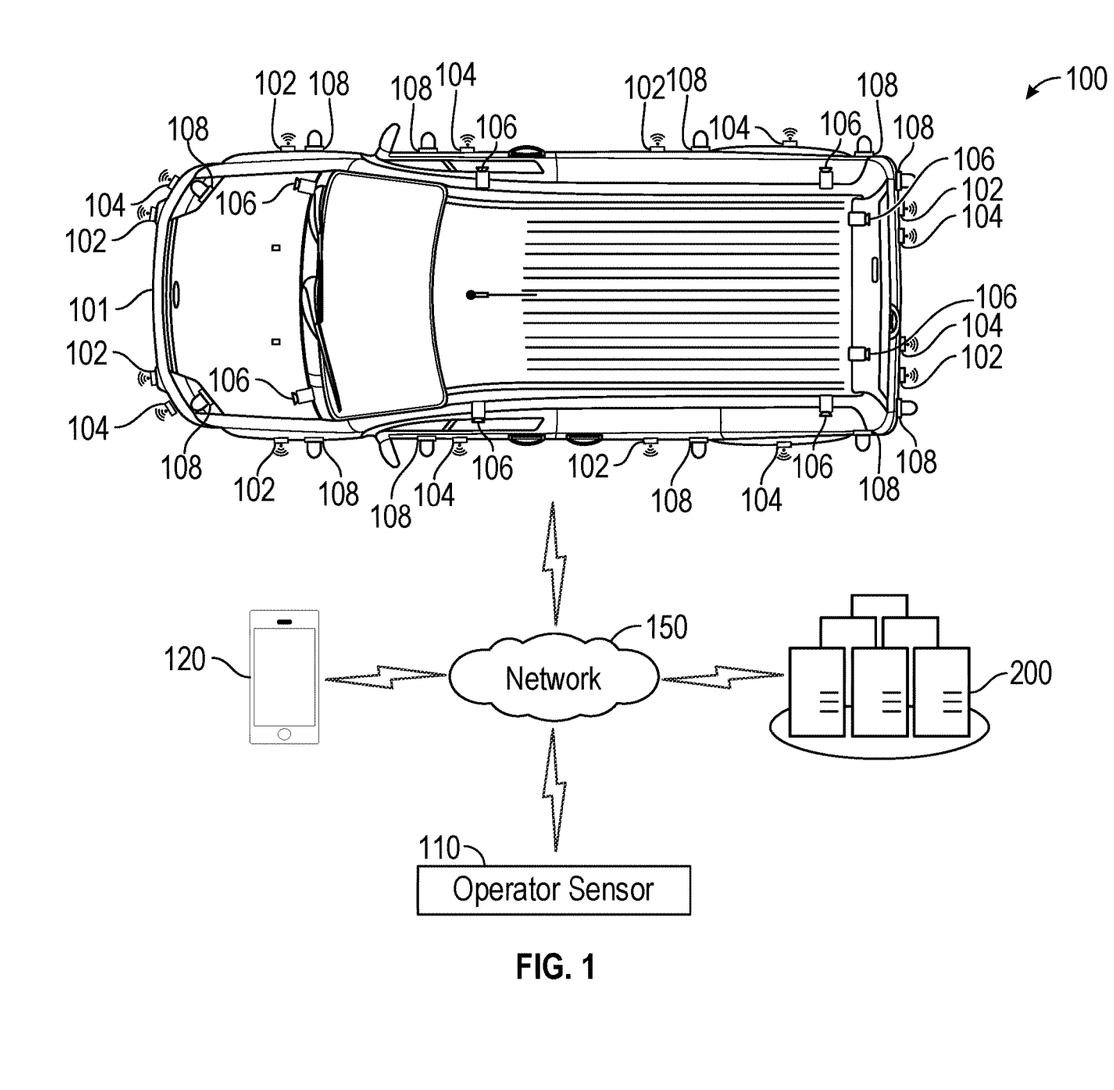
FIG. 1 illustrates a system for administering a hazard condition warning during a package delivery operation in accordance with the principles of the present disclosure.

Referring now to FIG. 1, an exemplary system for administering a hazard condition warning during a package delivery operation is provided. System 100 may include delivery vehicle 101 having one or more sensors configured to detect a hazard condition in a vicinity of delivery vehicle 101, e.g., radar sensors 102, ultrasonic sensors 104, and/or camera 106, and one or more indicators configured to generate an alert corresponding to the hazard condition, e.g., lights 108, a mobile application on mobile phone 120, or an HMI of vehicle 101. System 100 further includes operator sensor(s) 110 configured to detect a location of an operator of the delivery vehicle relative to the delivery vehicle.

A control module of vehicle 101, radar sensors 102, ultrasonic sensors 104, cameras 106, lights 108, and operator sensor 110 may all be communicatively coupled to integrated delivery controller 200 via, e.g., network 150. Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, cellular, near-field communication (NFC), Wi-Fi, Wi-Fi direct, machine-to-machine communication, and/or man-to-machine communication. Integrated delivery controller 200 may be located on one or more servers, and/or may be hosted in an existing electronic control unit (ECU), e.g., ABS ECU, powertrain ECU, or DAT ECU, or in a new ECU specifically for all delivery vehicle 101 functionalities described herein.

Delivery vehicle 101 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. According to embodiments of the present disclosure, integrated delivery controller 200 may be configured and/or programmed to operate with a vehicle having a Level-4 or Level-5 autonomous vehicle controller.

As shown in FIG. 1, radar sensors 102, ultrasonic sensors 104, cameras 106, and lights 108 may be disposed along the perimeter of delivery vehicle 101, e.g., front, rear, or side panel of delivery vehicle 101, to capture data in the entire vicinity of delivery vehicle 101. For example, cameras 106 may be positioned near the top of delivery vehicle 101 in order to capture image data of the ground adjacent to delivery vehicle 101. Lights 108 may include LED lights distributed along a lower portion of delivery vehicle 101 to illuminate the ground, e.g., to provide visibility. Additionally, lights 108 may include the headlights and/or taillights of delivery vehicle 108 to signal the operator of a hazard as described in further detail below. Lights 108 may further be disposed on an interior panel of the rear door(s) of vehicle 101, such that lights 108 may alert the operator of a hazard while the rear door(s) are open and the operator is in the vicinity of the rear door(s), e.g., when the operator is loading or unloading at the rear of vehicle 101. As will be understood by a person having ordinary skill in the art, system 100 may include more or less than the number of radar sensors 102, ultrasonic sensors 104, cameras 106, and lights 108 illustrated in FIG. 1.

Figure 4A:
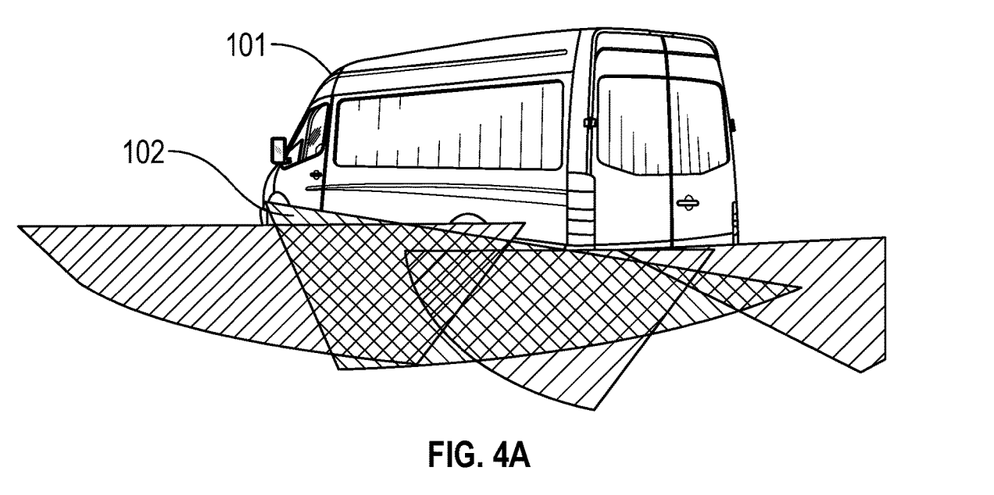
FIGS. 4A to 4I illustrate various implementations of sensors and indicators of a delivery vehicle in accordance with the principles of the present disclosure.

Radar sensors 102 may be configured to detect a hazard condition such as a moving body relative to the delivery vehicle, e.g., bicycle, scooter, car, etc. For example, radar sensors 102 may detect at least one of position, speed, distance, or direction of travel of the moving body. Radar sensors 102 may generate data indicative of the detected moving body and transmit the data to a processor of integrated delivery controller 200. FIG. 4A illustrates an exemplary field of view of radar sensors 102.

Figure 4B:
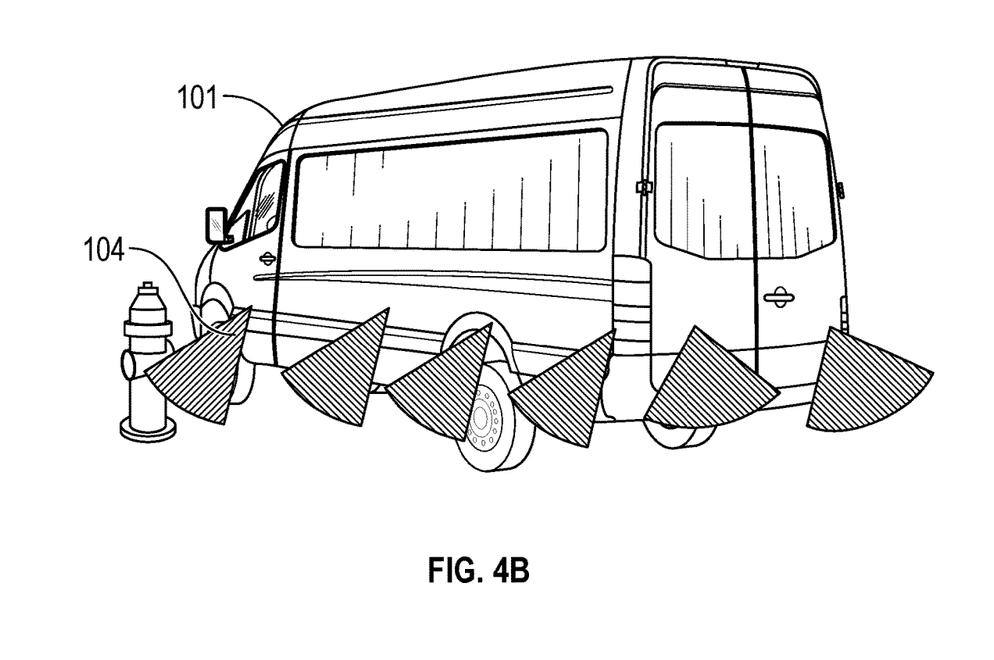

Ultrasonic sensors 104 may be configured to detect a hazard condition such as a static body relative to the delivery vehicle. For example, ultrasonic sensors 104 may emit ultrasound to determine the amount of space between a static hazard, e.g., detected by cameras 106, and vehicle 101, and may generate data indicative of the amount of space and transmit the data to the processor of integrated delivery controller 200. As shown in FIG. 4B, ultrasonic sensors 104 may determine that a static object, e.g., a fire hydrant, is too close to vehicle 101 such that there would not be enough space for the operator to exit vehicle 101.

Figure 4C:
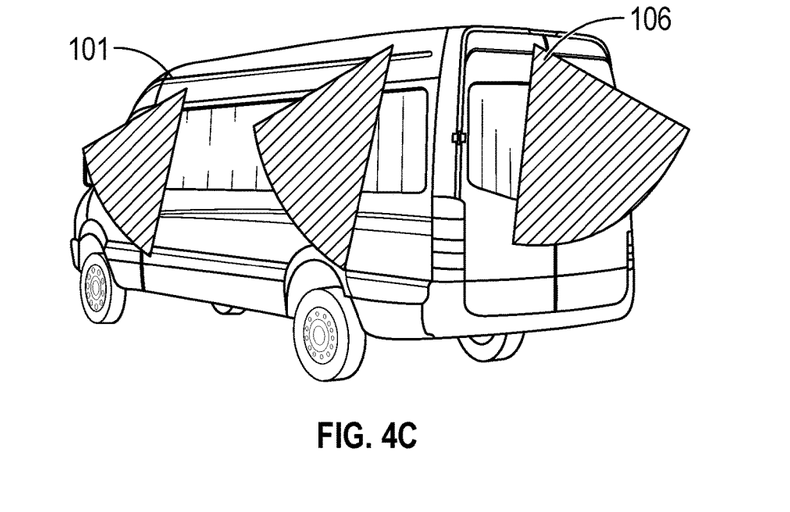

Cameras 106 may capture images of the ground adjacent to delivery vehicle 101, and generate image data indicative of the images and transmit the data to the processor of integrated delivery controller 200. Accordingly, the image data captured by cameras 106 may be used to identify hazards in the vicinity of vehicle 101 such as a poor surface condition such as snow, ice, potholes and other common tripping/slipping hazards. For example, the processor of integrated delivery controller 200 may execute a real-time object detection system with the image data to identify the hazard. In some embodiments, camera 106 may assist in detecting the location of the operator relative to vehicle 101. FIG. 4C illustrates an exemplary field of view of cameras 106.

Figure 4D:
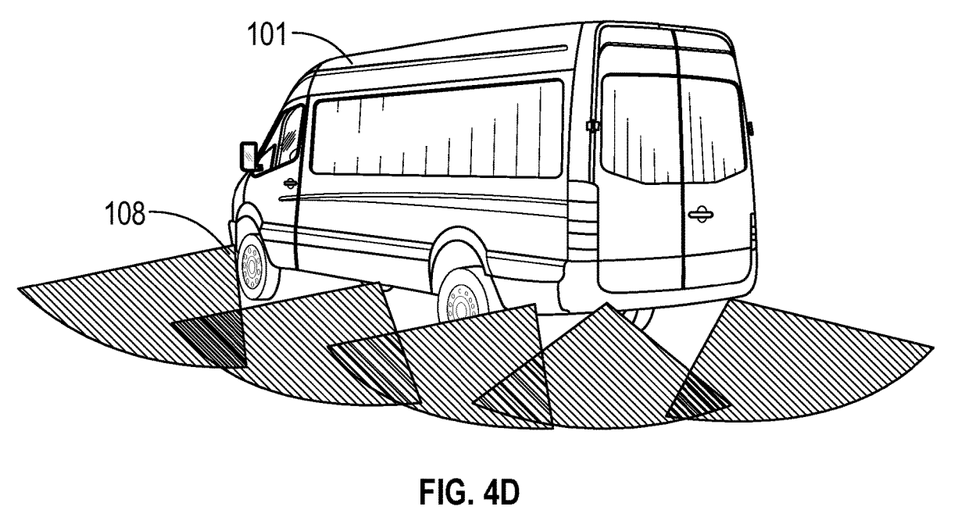
Figure 4E:
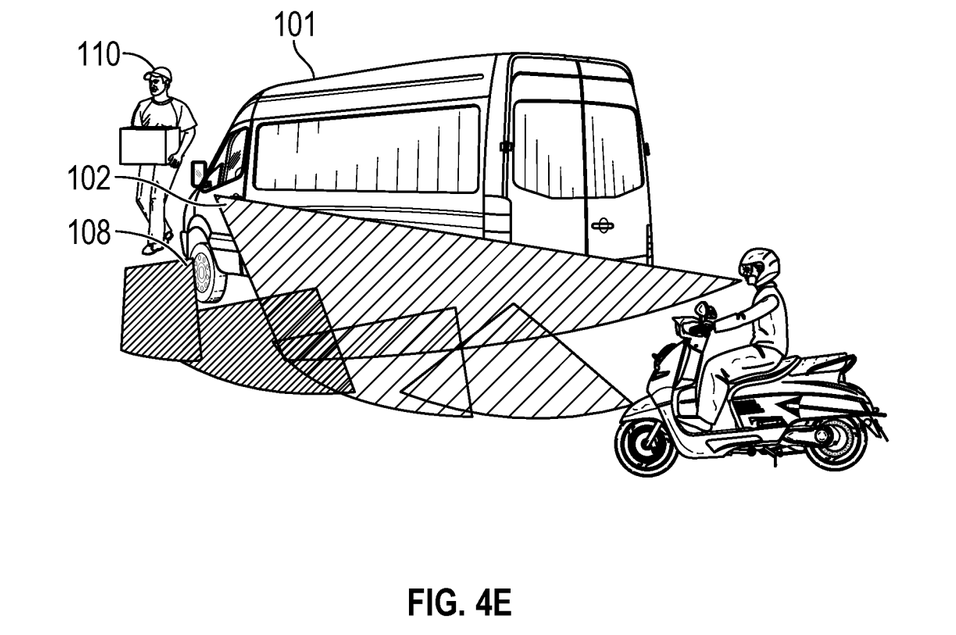
Figure 4F:
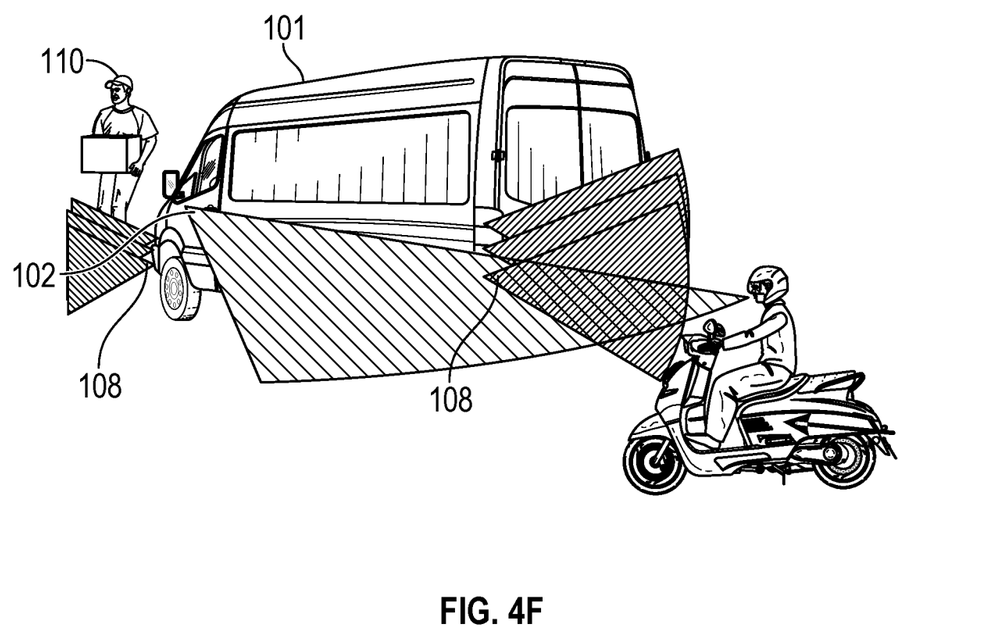
Figure 4G:
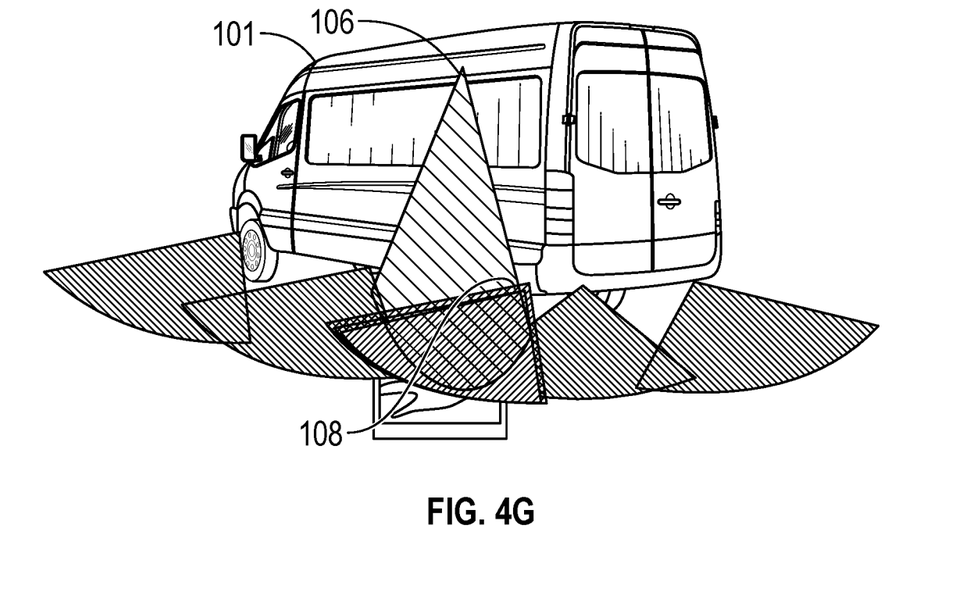
Figure 4H:
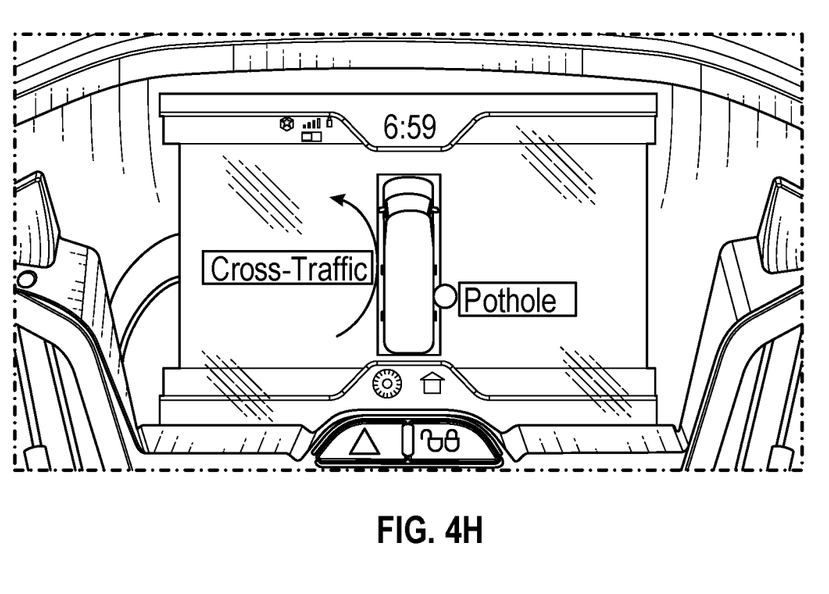
Figure 4I:
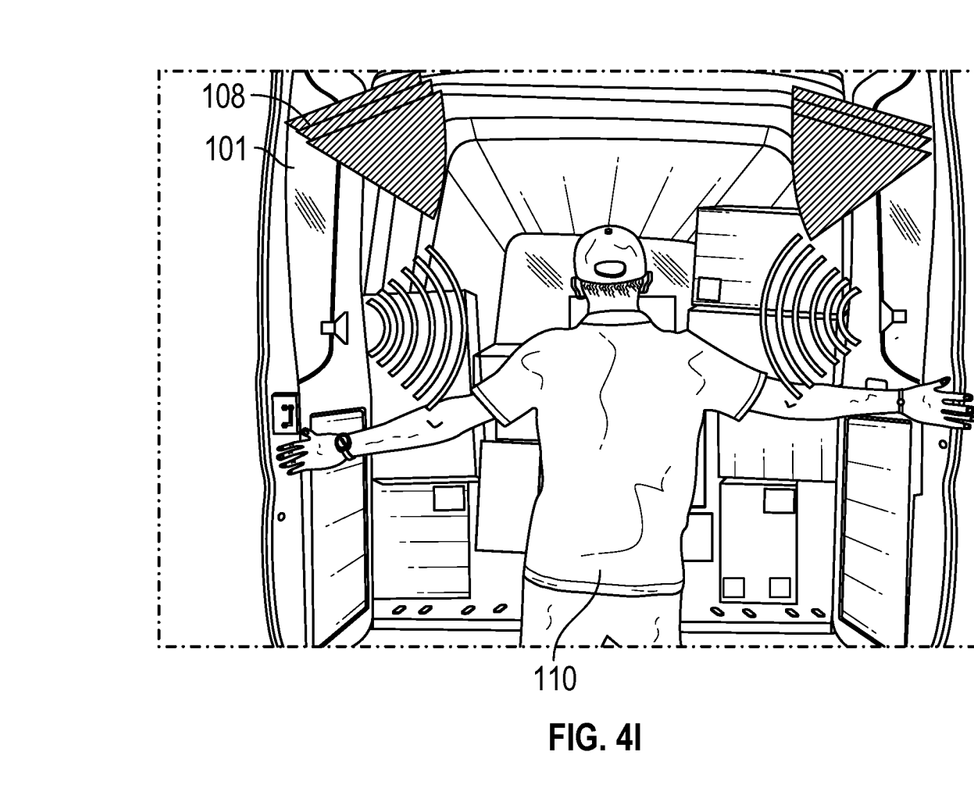

FIG. 4D illustrates an exemplary range of lights 108. Lights 108 may be configured to illuminate in a manner to direct attention to the hazard condition. For example, lights 108 around the perimeter of vehicle 101 may flash, change color of illumination, flash in a vicinity of the hazard condition, or flash in a sequence in a direction of travel of the hazard condition. For example, as shown in FIG. 4E, when a moving body, e.g., motorcycle, is detected in the vicinity of vehicle 101, lights 108 may illuminate in a sequence in the detected direction of travel of the motorcycle such that the operator may be visually alerted of the oncoming motorcycle as well as the direction and side of vehicle 101 the motorcycle is travelling. Alternatively or additionally, as shown in FIG. 4F, lights 108, e.g., taillights, may illuminate in a different color than the other lights to indicate that the motorcycle is approaching vehicle from the rear. Lights 108 may be illuminated based on the location of the operator, e.g., via operator sensor 101 carried by the operator. For example, if the operator is determined to be on the right side of vehicle 101, only lights 108 on the right side of vehicle 108 may be illuminated to catch the attention of the operator. Moreover, as shown in FIG. 4G, lights 108 adjacent to a detected hazard, e.g., a pothole detected by cameras 106, may flash or illuminate in a different color to indicate the location of the pothole relative to vehicle 101. As described above, lights 108 may further be disposed on an interior panel of the rear door(s) of vehicle 101 as shown in FIG. 4I. Accordingly, lights 108 may alert the operator of a hazard when the operator is loading or unloading at the rear of vehicle 101.

Operator sensor 110 may be, e.g., integrated in a key fob that is carried by the operator. Accordingly, the processor of integrated delivery controller 200 may determine the operator's location relative to vehicle 101 via the key fob by measuring the distance between the key fob and vehicle 101. In some embodiments, operator sensor 110 may include a door sensor configured to determine whether a door of the delivery vehicle is open or closed. Accordingly, processor of integrated delivery controller 200 may determine that the operator is still inside vehicle 101 if vehicle 101 has just come to a stop, e.g., parked, and the door is determined to be closed. As will be understood by a person having ordinary skill in the art, the door sensor may be the standard door sensing mechanism as part of the vehicle's standard electronic architecture.

Figure 2:
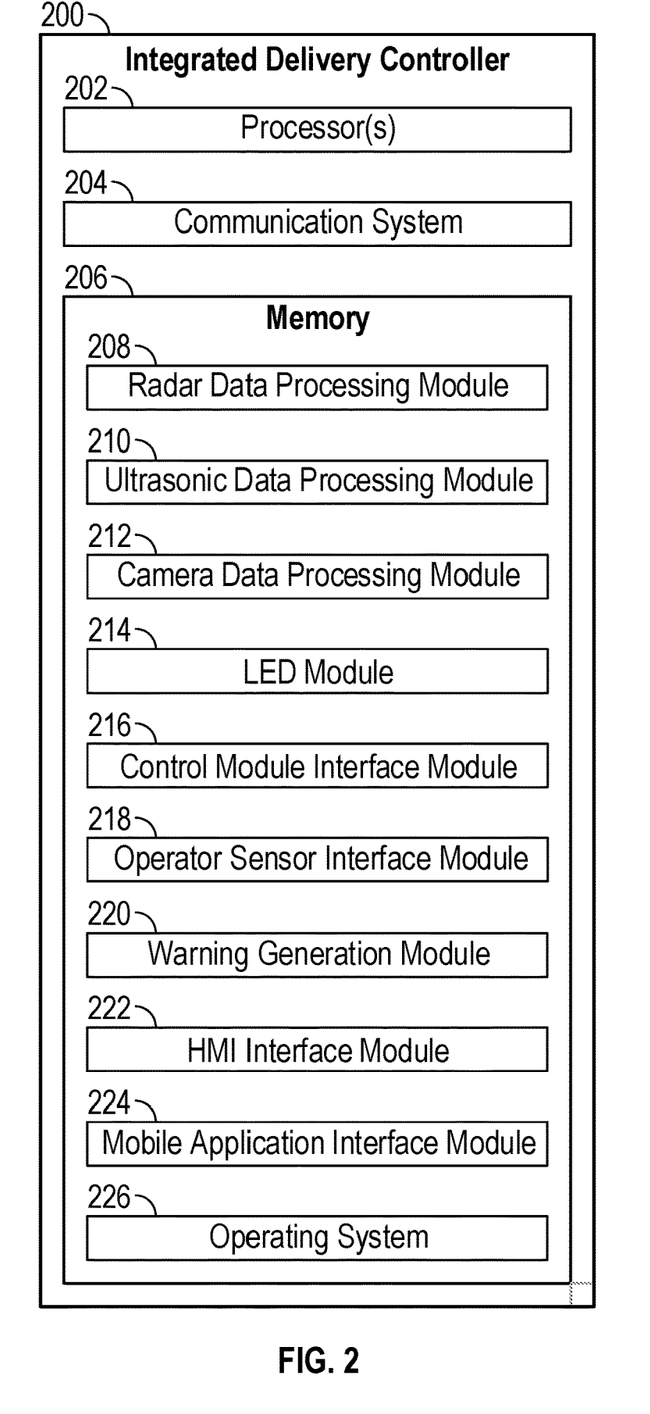
FIG. 2 shows some example components that may be included in an integrated delivery controller in accordance with the principles of the present disclosure.

Referring now to FIG. 2, components that may be included in integrated delivery controller 200 are described in further detail. Integrated delivery controller 200 may include one or more processors 202, communication system 204, and memory 206. Communication system 204 may include a wireless transceiver that allows integrated delivery controller 200 to communicate with vehicle 101 radar sensors 102, ultrasonic sensors 104, cameras 106, lights 108, operator sensor 110, and/or mobile phone 120. The wireless transceiver may use any of various communication formats, such as, for example, an Internet communications format, or a cellular communications format.

Memory 206, which is one example of a non-transitory computer-readable medium, may be used to store operating system (OS) 226, radar data processing module 208, ultrasonic data processing module 210, camera data processing module 212, LED module 214, control module interface module 216, operator sensor interface module 218, warning generation module 220, HMI interface module 222, and mobile application interface module 224. The modules are provided in the form of computer-executable instructions that may be executed by processor 202 for performing various operations in accordance with the disclosure.

Memory 206 may include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 206 may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). The computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Radar data processing module 208 may be executed by processor 202 for receiving and processing data from radar sensors 102. In addition, radar data processing module 208 may determine, e.g., position, speed, distance, or direction of travel of a moving body, based on the data received from radar sensors 102.

Ultrasonic data processing module 210 may be executed by processor 202 for receiving and processing data from ultrasonic sensors 104. In addition, ultrasonic data processing module 210 may determine an amount of space between vehicle 101 and a static hazard, e.g., a pothole or a fire hydrant, and further may determine whether there is enough space between vehicle 101 and the static hazard for the operator to exit the vehicle safely.

Camera data processing module 212 may be executed by processor 202 for receiving and processing image data from cameras 106. In addition, camera data processing module 212 may execute a real-time object detection system with the image data to identify the hazard, e.g., a poor surface condition or a tripping hazard. Moreover, camera data processing module 212 may determine the location of the operator relative to vehicle 101 based on the image data received from cameras 106.

LED module 214 may be executed by processor 202 for causing lights 108 to illuminate in a manner to direct attention to the hazard identified by radar data processing module 208, ultrasonic data processing module 210, and/or camera data processing module 212. For example, LED module 214 may causes lights 108 to flash, change color of illumination, flash in a vicinity of the hazard condition, and/or sequence flashing in a direction of travel of the hazard condition, to draw attention to the hazard. Moreover, LED module 214 may cause lights 108 to illuminate the ground adjacent to vehicle 101 to improve visibility for the operator, e.g., in a dark delivery destination and/or at night.

Control module interface module 216 may be executed by processor 202 to interface with various control modules of vehicle 101 such as powertrain control module, chassis control module, vehicle dynamics control module, restrain control module, driver warning system, pre-crash sensing system, together with various interior and exterior sensors. For example, control module interface module 216 may receive information from the vehicle dynamics control module regarding whether vehicle 101 is stationary. As described above, integrated delivery controller 200 may have limited or no functionality until it is determined that vehicle 101 is stationary. Moreover, control module interface module 216 may receive information from a driver door sensor of vehicle 101 and determine whether a driver door is open or closed. Further, control module interface module 216 may receive information from the vehicle dynamics control module that vehicle 101 just parked. Accordingly, control module interface module 216 may determine that the operator is still in the vehicle based on vehicle 101 having parked and the door still being closed. Additionally, control module interface module 216 may receive information from a rear door sensor of vehicle 101 and determine whether a rear door is open or closed. Accordingly, control module interface module 216 may determine that the operator may be at the rear of vehicle 101, such that lights 108 positioned on an interior of the rear door may be instructed to illuminate to alert the operator of a hazard.

Operator sensor interface module 218 may be executed by processor 202 for receiving location data from operator sensor 110, e.g., a key fob. In addition, operator sensor interface module 218 may determine the location of the operator relative to vehicle 101 based on the location data received from operator sensor 110. For example, operator sensor interface module 218 may determine which side of vehicle 101 the operator is currently. Moreover, operator sensor interface module 218 may determine that the operator has returned to vehicle 101, and thus, the delivery at the destination is complete.

Warning generation module 220 may be executed by processor 202 to determine whether to issue a hazard warning, e.g., via lights 108, an HMI of vehicle 101, or mobile application 120, based on the hazard identified by radar data processing module 208, ultrasonic data processing module 210, and/or camera data processing module 212, as well as the location of the operator determined by, e.g., operator sensor interface module 218. For example, if camera data processing module 212 determines that there is a pothole on the right side of vehicle 101, and operator sensor interface module 218 determines that the operator is approaching the right side of the vehicle, warning generation module 220 may determine that a hazard warning is necessary, and LED module 214 may instruct lights 108 on the right side of vehicle 101 to illuminate, e.g., red adjacent to the pothole. Moreover, if radar data processing module 208 determines that a moving body, e.g., a pedestrian, is moving toward the right side of vehicle 101, and further determines that the speed of the pedestrian is below a predetermined threshold, warning generation module 220 may determine that a hazard warning is not necessary. Memory 206 may store predetermine thresholds utilized by warning generation module 220 to determine whether a hazard warning is warranted.

HMI interface module 222 may be executed by processor 202 to interface with an HMI of vehicle 101, such that HMI interface module 222 may instruct the HMI to display the hazard warning, e.g., via vehicle speakers or SYNC screen. For example, FIG. 4H illustrates a SYNC screen of vehicle 101 displaying a bird's eye view of vehicle 101 and identified hazards, e.g., cross-traffic on the left side of vehicle 101 and a pothole on the right side of vehicle 101. Moreover, as shown in FIG. 4I, HMI interface module 222 may instruct the HMI to instruct rear speakers to generate an audio alert to warn the operator of a hazard. Additionally, HMI interface module 222 may instruct the HMI to instruct interior to lights of vehicle 101 to flash to warn the operator of a hazard when it is determined that the operator is still within vehicle 101.

Mobile application interface module 224 may be executed by processor 202 to interface with a mobile application installed on mobile phone 120 carried by the operator to generate the hazard warning, e.g., a message notification, a vibration, an audio alert, etc. For example, after warning generation module 220 determines that a hazard warning is necessary, mobile application interface module 224 may transmit a text notification to the mobile application installed on mobile phone 120 indicating that a hazard is detected. The notification may be accompanied by a preselected sound or vibration, chosen to alert the operator that an imminent hazard exists.

Figure 3:
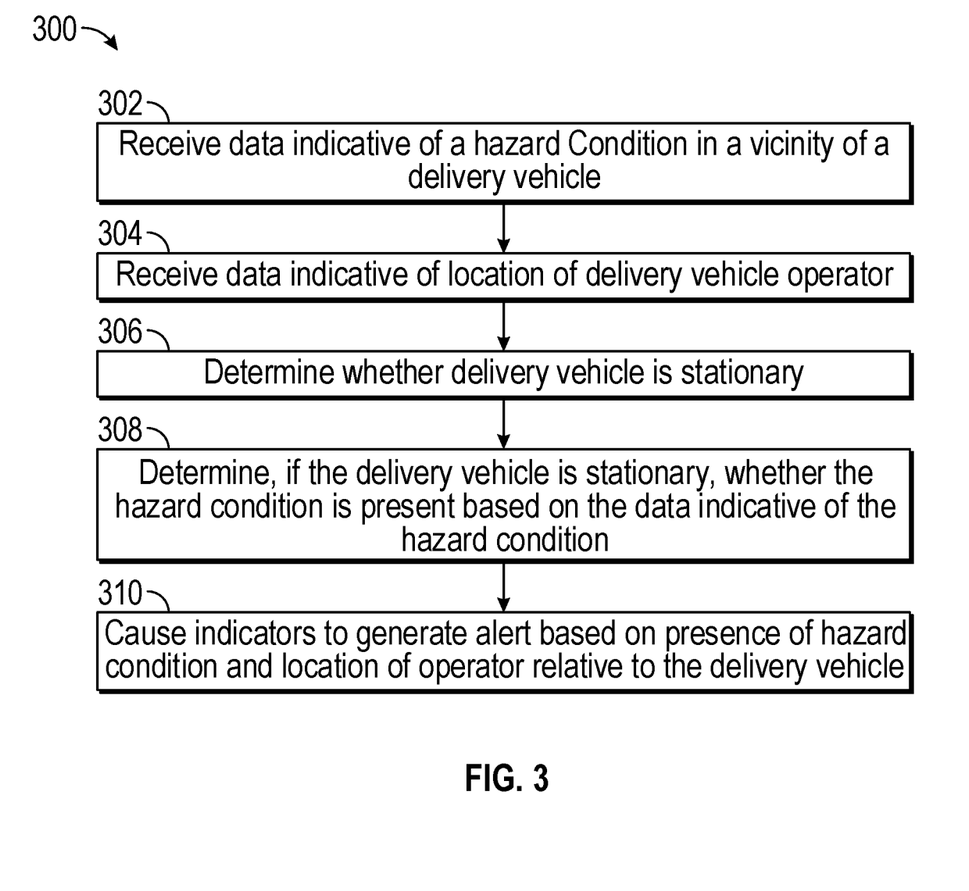
FIG. 3 is a flow chart illustrating exemplary steps for administering a hazard condition warning during a package delivery operation in accordance with the principles of the present disclosure.

Referring now to FIG. 3, method 300 for administering a hazard condition warning during a package delivery operation is provided. At step 302, processor 202 of integrated delivery controller 200 receives data indicative of a hazard condition in a vicinity of delivery vehicle 101, e.g., data from radar sensors 102 via radar data processing module 208, data from ultrasonic sensors 104 via ultrasonic data processing module 210, and/or image data from cameras 106 via camera data processing module 212. At step 304, processor 202 of integrated delivery controller 200 receives data indicative of a location of an operator of delivery vehicle 101, e.g., location data from operator sensor 110 via operator sensor interface module 220. At step 306, processor 202 of integrated delivery controller 200 determines whether vehicle 101 is stationary, e.g., via control module interface module 216. At step 308, processor 202 of integrated delivery controller 200 may determine, if the delivery vehicle is stationary, whether the hazard condition is present based on the data indicative of the hazard condition. At step 308, processor 202 of integrated delivery controller 200 may cause one or more indicators, e.g., lights 108 via LED module 214, mobile application 120 via mobile application interface module 224, or an HMI of vehicle 101 via HMI interface module 222, to generate the alert based on the presence of the hazard condition and the location of the operator relative to the delivery vehicle, e.g., if the alert is necessary as determined by warning generation module 220.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A system for administering a hazard condition warning during a package delivery operation, the system comprising:
    a dynamics control module configured to detect when a delivery vehicle is parked;
    one or more sensors, configured to detect a hazard condition in a vicinity of the delivery vehicle and to generate data indicative of the hazard condition, comprising one or more cameras configured to capture and transmit image data indicative of the hazard condition and to detect a location of an operator of the delivery vehicle relative to the delivery vehicle and/or the hazard condition;
    an operator sensor, configured to detect the location of the operator relative to the delivery vehicle, comprising a door sensor configured to determine whether a door of the delivery vehicle is open or closed;
    one or more indicators, configured to generate an alert corresponding to the hazard condition, comprising:
        one or more lights configured to illuminate the operator in association with detection of the location of the operator relative to the delivery vehicle and/or the hazard condition by the one or more cameras; and
        a display screen, installed in the delivery vehicle, configured to display a graphic representation of the delivery vehicle and the hazard condition, wherein a part of the graphic representation associated with the hazard condition is highlighted and/or blinking;
    a memory that stores computer-executable instructions; and
    a processor configured to access the memory and execute the computer-executable instructions to:
        determine, by the dynamics control module, whether the vehicle is parked;
        determine whether the hazard condition is present based on the data indicative of the hazard condition from the one or more sensors;
        determine that the operator is inside the delivery vehicle when the dynamics control module detects that the delivery vehicle is parked and the door sensor determines that the door is closed and/or based on detection of the location of the operator relative to the delivery vehicle by the one or more cameras; and
        cause, based on a presence of the hazard condition and the detected location of the operator relative to the delivery vehicle, the one or more indicators to generate the alert.

2. The system of claim 1, wherein the one or more sensors are disposed on at least one of a front, rear, or side panel of the delivery vehicle.

3. The system of claim 1, wherein the one or more sensors comprise one or more radar sensors configured to detect a hazard condition comprising a moving body relative to the delivery vehicle.

4. The system of claim 3, wherein the one or more radar sensors are configured to detect at least one of position, speed, distance, or direction of travel of the moving body.

5. The system of claim 1, wherein the one or more sensors comprise one or more ultrasonic sensors configured to detect a hazard condition comprising a static body relative to the delivery vehicle.

6. The system of claim 5, wherein the processor is configured to determine, if the delivery vehicle is stationary, whether the hazard condition is present by determining an amount of space between the static body and the delivery vehicle.

7. The system of claim 1, wherein the hazard condition comprises at least one of a surface condition or a tripping hazard.

8. The system of claim 1, wherein the processor is configured to determine, if the delivery vehicle is stationary, whether the hazard condition is present by executing a real-time object detection system based on the image data.

9. The system of claim 1, wherein the operator sensor further comprises a key fob configured to be carried by the operator.

10. The system of claim 1, wherein the one or more lights are further configured to illuminate in a manner to direct attention to the hazard condition.

11. The system of claim 10, wherein the manner comprises at least one of flashing, changing color of illumination, flashing in a vicinity of the hazard condition, sequencing flashing in a direction of travel of the hazard condition.

12. The system of claim 1, wherein the one or more indicators are integrated within a human-to-machine interface (HMI) of the delivery vehicle, and wherein the processor is configured to cause the HMI to generate the alert.

13. The system of claim 12, wherein the alert comprises an audio alert.

14. The system of claim 1, wherein the one or more indicators are integrated within a mobile phone application, and wherein the processor is configured to cause the mobile phone application to generate the alert by sending a notification to the mobile phone application.

15. A method for administering a hazard condition warning during a package delivery operation, the method comprising:
- determining, by a dynamics control module in communication with a delivery vehicle, when the delivery vehicle is parked;
- determining, by one or more sensors, a hazard condition in a vicinity of the delivery vehicle, wherein the one or more sensors comprise one or more cameras configured to capture and transmit image data indicative of the hazard condition and to detect a location of an operator of the delivery vehicle relative to the delivery vehicle and/or the hazard condition;
- determining, by an operator sensor and/or based on the image data captured and transmitted by the one or more cameras, a location of an operator relative to the delivery vehicle, wherein the operator sensor comprises a door sensor configured to determine whether a door of the delivery vehicle is open or closed;
- determining that the location of the operator is inside the delivery vehicle when the dynamics control module detects that the delivery vehicle is parked and the door sensor determines that the door is closed and/or based on detection of the location of the operator relative to the delivery vehicle by the one or more cameras;
- generating, by one or more indicators, an alert corresponding to the hazard condition, wherein the one or more indicators comprise:
  - one or more lights configured to illuminate the operator in association with detection of the location of the operator relative to the delivery vehicle and/or the hazard condition by the one or more cameras; and
  - a display screen, installed in the delivery vehicle, configured to display a graphic representation of the delivery vehicle and the hazard condition, wherein a part of the graphic representation associated with the hazard condition is highlighted and/or blinking; and
- causing, based on the hazard condition and the location of the operator relative to the delivery vehicle, the one or more indicators to generate the alert.

* * * * *